Sept. 7, 1943.  H. R. ETZLER  2,328,632
INSECT CATCHER
Filed Nov. 14, 1941  3 Sheets-Sheet 1
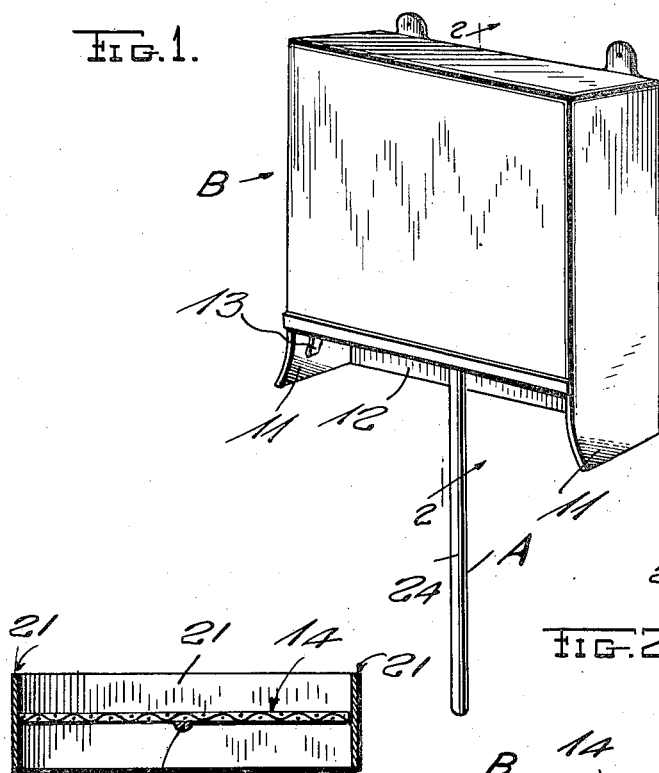
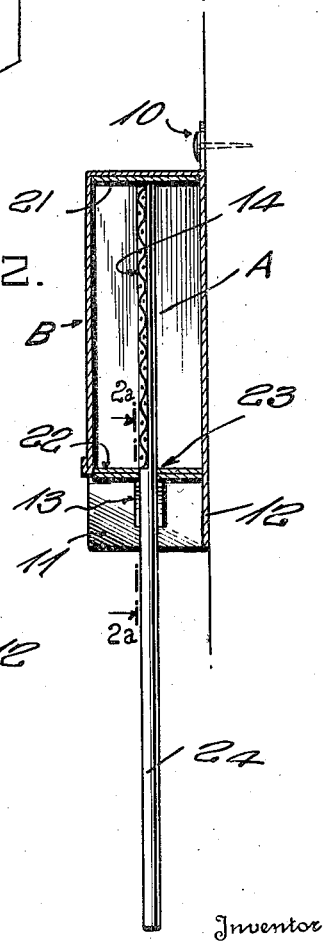
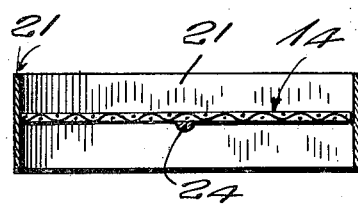
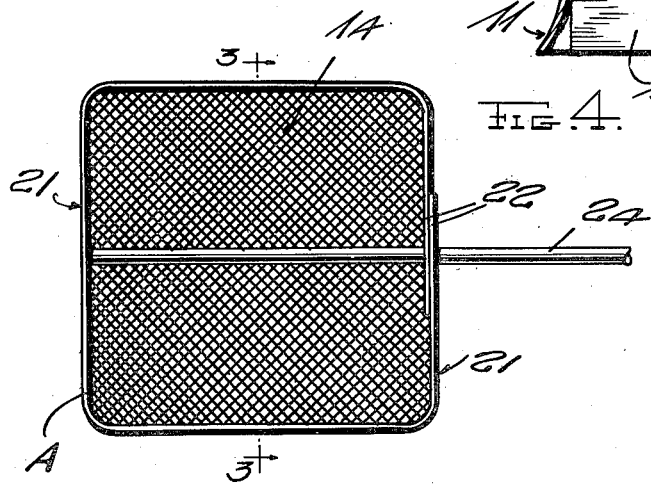
Inventor
Harry R Etzler Sept. 7, 1943.                H. R. ETZLER                2,328,632
                              INSECT CATCHER
                           Filed Nov. 14, 1941              3 Sheets-Sheet 2
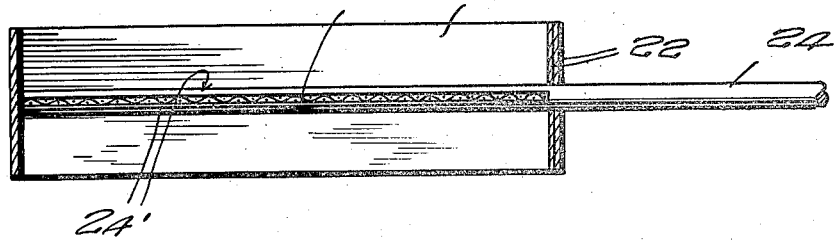
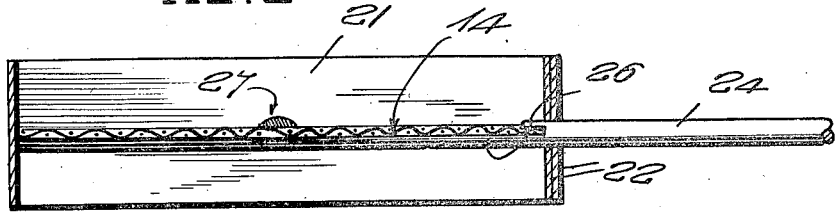
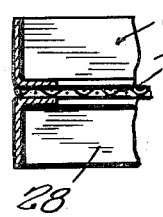
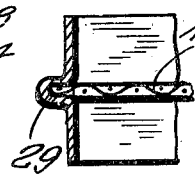
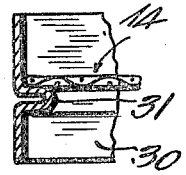
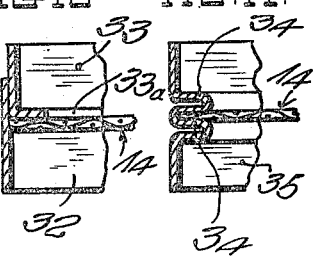
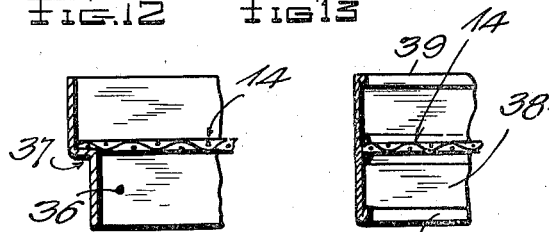
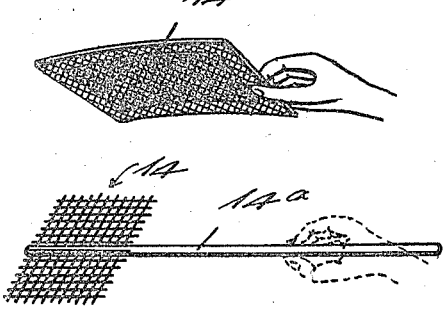
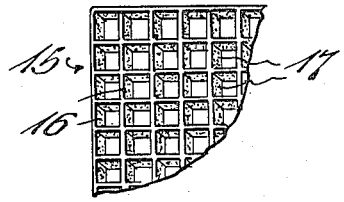
Inventor
Harry R. Etzler Sept. 7, 1943.   H. R. ETZLER   2,328,632
INSECT CATCHER
Filed Nov. 14, 1941   3 Sheets-Sheet 3
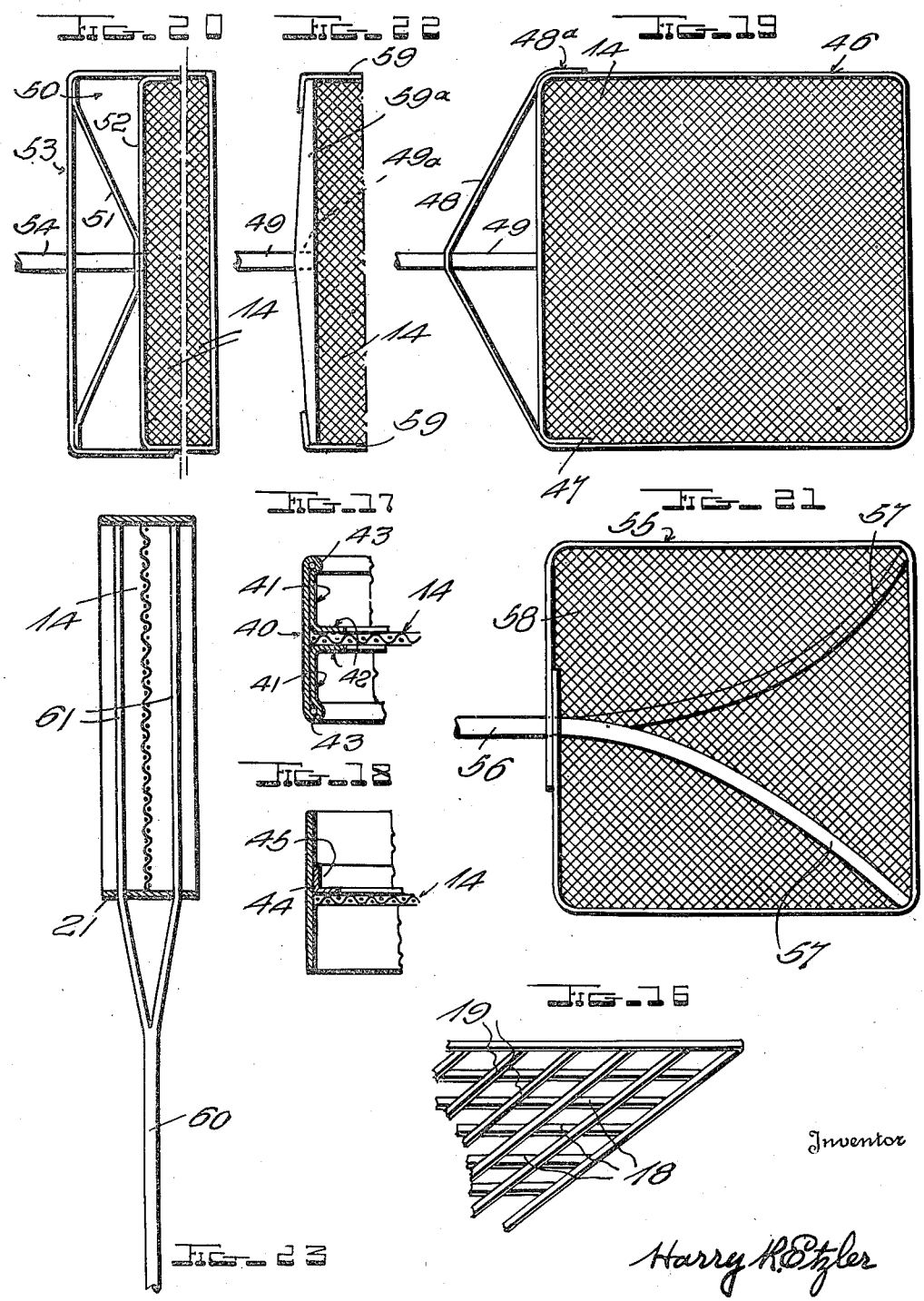
Inventor
Harry R. Etzler Patented Sept. 7, 1943

2,328,632

UNITED STATES PATENT OFFICE 2,328,632

INSECT CATCHER

Harry R. Etzler, Mount Clemens, Mich.

Application November 14, 1941, Serial No. 419,188

7 Claims. (Cl. 43—136)

This application is a continuation-in-part of and successor to my prior application Ser. No. 359,961, filed October 5, 1940, and abandoned in favor of the present application and my copending application Ser. No. 430,291, filed February 10, 1942.

This invention relates to an insect catcher set, and especially to a manual device for catching flying insects and a receptacle therefor and which device may be retained out of sight in said receptacle when not in use but be available for ready removal and use, from the receptacle usually hung on a wall.

I am aware that fly swatters and sprays are used for catching such insects and, while these have been successful in operation, they have also been found objectionable. In the case of both of them, the insects have to be collected and disposed of and often fall unnoticed into food material in the kitchen, on the dining table, etc., proving a quite unappetizing spectacle to contemplate. The swatters usually maim or crush the insects, with consequent soiling and disfiguring of the object on which they are swatted, and it is usually a mangled insect that must be disposed of and the swatter itself becomes contaminated, retaining this repulsive aspect. Sprays are costly, are not usually ready when needed and provide nauseating and irritating fumes, and often the insects must be gathered up and disposed of before some of them regain consciousness again.

The prior art has failed to overcome the various difficulties, and it is believed that this is primarily due to the fact that it has never provided, as in the present invention, a relatively stiff and flat form-sustaining entangling sheet. Such a sheet may be of any desired area and thickness and may actually be used independently of a shield or of a handle, being grasped marginally by the fingers and wielded through the air to catch the insects, substantially retaining its shape during the operation, and it is also capable of embodiment, permanently or replaceably, in various forms using a shield of paper, for instance, and preferably having a handle, in all examples providing an inexpensive, light-weight article which is used to swoop insects from the air.

The light weight offered by my structural design, due mainly to the inherent form-supporting character of my entangling sheet, is imperative to the success of the device in that its light weight diminishes the danger of destructive impact and allows for freer and less tiring operation, added to the soft or harmless exterior parts, regular profile, quiet action, and other features, in all providing a set of corelated properties conducive to care-free and efficient wielding, considerations which were neglected in the prior art and which have mainly contributed to the cause of their failure to be accepted by the public.

I aim to provide such a catcher of light weight, inexpensive, least resistant to passage through the air, and least liable to fan the air or increase the air pressure in advance of it thereby startling the insect and reducing the chance for its capture.

In all cases, the stiff, form-sustaining or inherently self-supporting form of the entangling sheet prevents excessive bulging, buckling, kinking, sagging, or loss of shape. The article as a whole may be burned or in any other manner disposed of.

It is one object of this invention to provide a more practical device by the use of which an insect may be caught while in flight and thus caught and disposed of without soiling a surface upon which the insect was resting when first noticed.

Another object of my invention is to provide devices using a marginal shield of light weight material for the sheet, which is of such an exterior that it cannot scratch or mar any surface which it contacts, utilizing the stiffness of the entangling sheet for the support and shaping of the shield and preferably a handle attached to either or both the shield and the entangling sheet, and, in some instances, interconnected in a novel manner affording the requisite strength.

Another object of my invention is to provide a receptacle of a simple form preferably to be fastened to a wall and have sheltering and guiding means to facilitate the insertion of the catcher and means to retain the latter.

I further aim to provide a quiet-acting device and one having an outline which is less likely to catch onto and pull other objects out of place and also one having small mass, thus allowing rapid performance and minimum danger from concussion.

I further provide, in all examples, exceedingly simple and inexpensive constructions which are to be taken as representative rather than limitary and which may utilize in their manufacture readily adaptable inexpensive materials like paper, pulp and wood.

My device is manually operated. A person grasps the device and waves it, broadside, to and fro, through the air, where the insect is flying, manipulating it to touch the insect with the entangling surface of the device. In case a fly is resting on an object, the entangling sheet is brought to sweep past, close by, the surface, thus frightening the insect and causing it to fly off into the air in front of the approaching entangling sheet and to be touched by it, and, in the event flies are in secure locations, the operator's idle hand may be used to scare the insects out into the open while the device is being waved to contact them.

Various additional objects and advantages will, in part, become apparent, from a consideration of the following description, taken in connection with the accompanying drawings, wherein:

Figure 1 is a perspective view of the receptacle as it hangs usually on a wall, the catcher being shown in its proper place therein.

Figure 2 is a vertical section taken on the line 2—2 of Fig. 1.

Figure 2a is a detailed section taken on the line 2a—2a of Fig. 2.

Figure 3 is a cross section on the line 3—3 of Fig. 4.

Figure 4 is a plan view of the catcher of Figs. 1-3 inclusive.

Figure 5 is a sectional view showing a modified form of handle.

Figure 6 is a sectional view showing another modified catcher construction, wherein a cross bar is provided at one side of the sheet as a reinforcement.

Figures 7 to 13, inclusive, disclose fragmentary sections of modified forms of shields and means whereby the entangling sheet is carried thereby.

Figure 14 is a perspective view showing the use of an entangling sheet used as an insect catcher, said sheet being devoid of a marginal shield.

Fig. 15 is a fragmentary perspective view of one specific form of a variety of entangling sheets that may be used.

Figure 16 is a fragmentary perspective view of another specific form of a variety of entangling sheets that may be used.

Figures 17 and 18 are detailed sections, illustrating further modifications of marginal shields and means for attaching or engaging entangling sheets to or with the shields.

Figure 19 is a plan view, illustrating a catcher having a modified form of shield.

Figure 20 is a fragmentary plan view of another form of the invention having a further specific form of shield.

Figure 21 is a plan view of still another form of the invention, having a different way of arranging the handle part within the shielding frame.

Figure 22 is a fragmentary plan view of an extra staunch section of the shield or frame to support the handle.

Figure 23 is a vertical sectional view through another form of the invention, having a shield and specific form of handle.

Figure 24 is a perspective view showing an entangling sheet with a handle attached but without a shield, being used as an insect catcher.

Referring specifically to the drawings, wherein like characters designate like or similar parts, it is to be borne in mind that the illustrated forms are simply examples of some of the various forms or modifications which the invention may take.

In Figure 1, the insect catcher set, as a whole, is illustrated with the catcher part proper designated A, shown as a whole in plan view Fig. 4, inserted into the receptacle B and having only the handle part thereof protruding from the receptacle part B. Fig. 2 is a sectional view of the catcher-set together.

This receptacle is usually fastened, as at 10 in Fig. 2, preferably high on a wall so that the catcher A may be readily inserted into and removed from the lower end thereof, aided by guides 11 on the side walls of the receptacle and a slide 12 being the rear wall of the receptacle and which parts 11 and 12 extend below the opening of the receptacle. I do not limit myself to the material of which the receptacle B is made or to the specific form thereof. It may be made of paper which will afford sufficient resilient action to grip or retain the catcher A. I may also use, for the same purpose, an element such as a strip of stiff paper such as cardboard to form a hump which is glued to the receptacle, as detailed in Fig. 2a, or formed integral therewith.

The catcher A, in all forms, employs a sheet of entangling material, as designated 14. This sheet 14 is of open work or open mesh formation, and one form may be a sheet of textile or other fabric which is stiffened in any desirable manner to render it form-sustaining. This sheet may be woven and, to impart stiffness to it, may be subjected to a coating or impregnation with any suitable material. Or, this sheet may be fabricated from parts that are in themselves stiff or form-sustaining. In all instances, the sheet 14 is applied or coated over its surfaces with an insect entangling material.

The sheet could even be form-sustaining when wielded as a catcher when grasped with one's fingers at the margin thereof, as shown in Figure 14, or when grasped by a handle 14a attached to the sheet, as shown in Figure 24.

The sheet 14 might also be of the specific form shown in Fig. 15, where the elements which provide a cellular construction having openings 15 which are made up of strips or the like 16 which form partitions of a greater depth than their wall thickness. In this form of the invention, the entangling material 17 may take the form of a coating on the side faces of the partitions within the meshes 15.

Another form of the entangling sheet is shown in Figure 16, consisting of strips 18 crossed by superposed strips 19, glued thereto, and all strips, as well as those in Fig. 15, suitably stiffened to be form sustaining. The sheet of Figure 16 is of open mesh form and the entangling material may be applied to any or all surfaces of the formed sheet. The structures of both Figs. 15 and 16 may be made of strips of paper or other material, or they may be moulded, stamped or otherwise formed from plastics or made of papier-mâché.

In Figures 1 to 4, a marginal shield 21 surrounds the sheet 14, the latter being marginally glued, or in any manner fastened to the shield 21 intermediate the opposite edges of the latter. As shown by way of example only, shield 21 has its ends overlapping, as at 22, and glued together, if desired, and both provided with an opening 23 through which a manipulating handle 24, usually of wood, passes, such handle being reduced to half thickness within the shield, as shown in Figure 2, and at the points of contact with the shield, glued or otherwise fastened to the shield. Such shield 21, in the present instance, and in all instances where I refer to a shield in the specification, may be made of a strip of paper or other suitable material. This strip, in this particular modification, is bent to fit about the entangling sheet, and its lateral edges are in spaced relation to the entangling sheet to cause it to project out from opposite side faces of the entangling sheet to the end that when the catcher is set upon a supporting surface, the entangling sheet will be held in spaced relation to the surface and the surface will not be marred by contact with any part of the catcher or the entangling qualities of the sheet impaired. That portion of the handle which extends across the entangling sheet gives added stiffness to the sheet and the shield, and it also functions to brace and secure the outwardly extending part of the handle to the rest of the device, the stiffness and form-sustaining qualities of the entangling sheet imparting shape to the shield 21 and maintaining it extended operatively against collapse.

Since the shield, together with the sheet, are of form-sustaining character, and the side walls of the receptacle being of sufficient resiliency, easy means are provided for the receptacle B to embrace and retain the catcher A. I may also use for the purpose an element such as a strip of paper of stiff kind such as cardboard to form the hump 13 and glued to the receptacle or formed integral therewith.

In the form of Figures 1 to 4 and all other forms where the handle has a portion extending over and touching the entangling sheet, the entangling material is also put on that portion of the handle which then becomes part of the entangling surface.

In Figure 5, I have shown an embodiment of the invention wherein the handle 24 is slit longitudinally from its front end to form longitudinally extending parallel arms 24'. the sheet of material 14 being disposed through the slit and the arms adhering to the confronting surfaces of the sheet.

In Figure 6, I show a transverse reinforcing member 27 extending across the sheet 14 at the opposite side to that of the handle part 26 and along the entangling sheet and this member 27 is preferably attached through the sheet to the adjacent part of the handle.

In Figures 7 to 13 and 17 and 18, I show various modifications which the shield 21 may take. In Figure 7, the sheet 14 is glued between two inwardly extending flanges of strips 28 of angular form. In Figure 8, the sheet 14 is entered in an outward recess 29 on the shield in which it may be glued, if desired. In Figure 9, the shield 30 has an inwardly depressed rib 31 against either side of which the sheet 14 may be placed. In Figure 10, the shield has two sections 32 and 33 glued together, part of the sheet 33 being bent to form a ledge 33a against which the sheet 14 is placed. In Figure 11, the sheet 14 is permanently or removably mounted between ledges 34 formed by inwardly crimped portions of the strip of which the frame 35 is formed. In Figure 12, the shield 36 has an offset shoulder or ledge 37 against which the sheet 14 is placed. In Figure 13, the shield 38 has the sheet 14 marginally glued or otherwise fastened to the plane inside wall thereof, this wall having marginal reinforcing beads 39, which stiffen the edge of the shield. In Figure 17, the shield strip 40 has inwardly projecting or return portions 41 with flanges 42 between which the sheet 14 is removably disposed or glued, as preferred, the outer edges of strip 40 constituting reinforcing beads 43 which provide also dull or rounded edges for the shield. In Figure 18, the shield 44 has an angular strip of material 45 glued to it, against which the sheet 14, in turn, is placed.

In Figure 19, the shield, which is designated 46, surrounds and has the sheet 14 glued or otherwise held thereto. The shield is formed of a single strip which extends about the sheet and has one end glued, as shown at 47, the other extended end portion of the strip being bent to form a yoke 48 which is glued to the shield, as shown at 48a, and projects rearwardly from the shield. The yoke tapers rearwardly and, at its apex, is perforated to receive the handle 49 which has its front end glued to the shield.

Figure 20 discloses a construction somewhat similar to Figure 19, but employing a strip forming a shield about an entangling sheet and an end of which is extended to form a rectangular outer part describing the space designated 50 within which a brace 51 is fastened to opposed strip portions 52 and 53. The handle 54 passes through strip portion 53 and is secured at the junction of portions 51 and 52.

In Figure 21, the shield 55 is of the construction shown in Figure 4, but the handle 56 has its portion within the shield formed with arms 57 which are curved longitudinally and diverge forwardly at a tangent to each other. These arms are glued to opposite side faces of the sheet 58 and, at their front ends, may be glued to the shield.

In the form shown in Figure 22, the shield consists of a strip 59 having its ends fastened to a stauncher strip or bar 59a of balsam wood or other light material. Usually, a wooden handle 49 is inserted and fastened in a hole 49a formed in the cross bar 59a.

The form of Figure 23 differs from the other forms in that the handle 60, usually of wood, is slit, as shown, and has spaced apart portions 61 passing through openings at one side of the shield 21 and, at their free ends, these portions 61 are glued or otherwise fastened to the confronting portion of the shield. Portions 61 are located on opposite sides of the sheet 14 which, as usual, is held fastened marginally in any suitable manner within and to the shielding frame 21.

It will be understood that I have made the foregoing disclosures by way of example only and that they are not to be taken as limitations of the scope of my invention.

Having thus described the invention, what I claim is:

1. In combination, a device for catching insects comprising a comparatively stiff self-sustaining sheet having an entangling surface, a handle for carrying and manipulating the sheet, and a frame of flexible yieldable material fitted about and in shielding relation to said sheet and its entangling surface and sustained in form and against collapse by the stiff sheet, and a housing for holding the catcher when not in use and adapted to be mounted on a support, said housing having enclosing walls relatively arranged so as to be engaged by the frame when the catcher is inserted therein to maintain the catcher in an upright position and being open at one side for insertion and removal of the catcher, certain of said walls of the housing having portions extending beyond the open side of the housing and forming flaring guiding means for guiding the catcher into the housing, and means on opposed walls of the housing adjacent to its open side for engaging opposed sides of the frame to hold the catcher disposed within the housing and yieldably resisting removal of the catcher from the housing.

2. In combination, a rectangular self-sustaining insect entangling sheet formed of stiffened material, a rectangular shield frame about the sheet formed of a strip of material fitting about and secured to the sheet and sustained and held from collapse thereby, and a handle to carry and manipulate the sheet and frame, and a receptacle having a body of rectangular formation to house the catcher when not in use, the walls of the housing body being adapted to snugly enclose the catcher and relatively arranged so as to be engaged by the surfaces of the frame when the catcher is inserted to maintain the catcher in an upright position, said housing having an open side for insertion and removal of the catcher and of such size and shape as to be substantially closed by the base portion of the shield frame of the catcher when so inserted, three of the walls of the housing extending beyond its fourth wall at its open side and forming guiding means engageable by the frame for guiding the catcher into the housing, and keeper means carried by certain of the walls of the housing at opposite sides of the opening and engageable with opposite sides of the frame for yieldably resisting removal of the frame from the housing.

3. In combination, a receptacle adapted for attachment to a support and having an entrance and exit opening, and an insect catcher slidably insertible into and withdrawable from the receptacle through said opening, said catcher comprising a blade formed of a sheet of normally soft, flexible material stiffened to render it self-sustaining, and a shield frame of relatively less stiffness than the material comprising the sheet and marginally secured to and sustained against deformation by the sheet, said frame embodying at least two opposed surfaces adapted to yield inwardly to a certain degree against the stiffness of the sheet, the receptacle having guide surfaces engageable by said opposed surfaces of the frame for guiding the catcher into and out of the receptacle, and resilient engaging elements of comparatively soft, material on the receptacle adjacent to the exit opening engageable with said opposed surfaces of the frame to hold the inserted catcher within the receptacle and permit of its sliding withdrawal therefrom.

4. In combination, a receptacle including front, back and side walls and having an entrance and exit passage opening through its bottom and through the lower portion of its front wall, the back wall and side walls having portions depending below the lower edge of the front wall and defining said passage, the depending portions of the side walls being outwardly flared, an insect catcher including a blade and a shield frame about the blade slidably insertible into and withdrawable from the receptacle through said passage and adapted to be guided into and out of the receptacle by engagement of said frame with the depending portions of the back and side walls, and retaining elements on the side walls of the receptacle adjacent to the passage and said depending portions of the side walls engageable with opposite sides of the shield frame for yieldingly holding the catcher within the receptacle and permitting of its sliding withdrawal therefrom.

5. In combination, a receptacle of rectangular form and including front, back and side walls and having an entrance and exit passage opening through its bottom and through the lower portion of its front wall, the back wall and side walls having portions depending below the lower edge of the front wall and defining said passage, the depending portions of the side walls being outwardly flared, and an insect catcher slidably insertible into and withdrawable from the said passage, said catcher including a blade and a shield frame bounding the blade and having side portions spaced a distance substantially equal to the distance between the inner surfaces of the side walls of the receptacle, and resilient retaining elements on the side walls of the receptacle adjacent to the passage and to said depending portions of the side walls for yieldingly engaging the side portions of the catcher frame and holding the catcher within the receptacle and permitting of its sliding withdrawal therefrom.

6. In combination, a receptacle of rectangular form and including front, back and side walls and having an entrance and exit passage opening through its bottom and through the lower portion of its front wall, the back wall and side wall having portions depending below the lower edge of the front wall and defining said passage, and an insect catcher slidably insertible into and withdrawable from the said passage and including a blade and a shield frame bounding the blade, said blade and frame being of a form to fit snugly within the receptcle, said frame including side portions spaced a distance substantially equal to the distance between the inner surfaces of the side walls of the receptacle and also including a base portion adapted to substantially close the entrance and exit passage of the receptacle when the catcher is enclosed therein, and resilient retaining elements on the side walls of the receptacle adjacent to the passage and to said depending portions of the side walls for yieldingly engaging the side portions of the catcher frame and holding the catcher within the receptacle and permitting of its sliding withdrawal therefrom.

7. In combination, an insect catcher, comprising a substantially flat body portion having insect entangling substance applied thereto, a shielding frame fitting about the body portion and extending out substantially perpendicularly from the body portion in shielding relation to the entangling substance, a handle attached to the insect catcher to facilitate manipulation thereof, a receptacle for the catcher adapted to engage a support and house the insect catcher when not in use, the receptacle having front, back and side walls defining an opening for the insertion and removal of the catcher, certain of the receptacle walls extending beyond the opening and having an outwardly flaring portion adjacent the opening to guide the catcher into the receptacle, and keeper means on opposed walls of the receptacle to engage the catcher for yieldably resisting removal of the catcher from the receptacle.

HARRY R. ETZLER.